(12) United States Patent
Main et al.

(10) Patent No.: US 11,876,794 B2
(45) Date of Patent: *Jan. 16, 2024

(54) MANAGED DOMAINS FOR REMOTE CONTENT AND CONFIGURATION CONTROL ON MOBILE INFORMATION DEVICES

(71) Applicant: CIS MAXWELL, LLC, Ottawa (CA)

(72) Inventors: Alexander James Main, Ottawa (CA); Ron Vandergeest, Ottawa (CA); Paul Litva, Ottawa (CA)

(73) Assignee: CIS MAXWELL, LLC, Ottawa (CA)

( * ) Notice: Subject to any disclaimer, the term of this patent is extended or adjusted under 35 U.S.C. 154(b) by 221 days.

This patent is subject to a terminal disclaimer.

(21) Appl. No.: 17/201,196

(22) Filed: Mar. 15, 2021

(65) Prior Publication Data

US 2021/0336942 A1    Oct. 28, 2021

Related U.S. Application Data

(63) Continuation of application No. 16/298,631, filed on Mar. 11, 2019, now Pat. No. 10,951,608, which is a
(Continued)

(51) Int. Cl.
*H04L 9/40* (2022.01)
*G06F 21/53* (2013.01)
(Continued)

(52) U.S. Cl.
CPC ............ *H04L 63/083* (2013.01); *G06F 21/53* (2013.01); *G06Q 30/0267* (2013.01); *H04W 12/086* (2021.01); *H04W 12/37* (2021.01)

(58) Field of Classification Search
CPC .... H04L 63/083; G06F 21/53; G06Q 30/0267
See application file for complete search history.

(56) References Cited

U.S. PATENT DOCUMENTS 3,403,389 A    9/1968 Ellson et al.
8,204,480 B1   6/2012 Lindteigen et al.
(Continued)

FOREIGN PATENT DOCUMENTS

CA    2838205 A1    2/2004
CN    1584843 A     2/2005
(Continued)

OTHER PUBLICATIONS

U.S. Appl. No. 16/673,758 Notice of Allowance dated Feb. 8, 2022 (13 pages).
(Continued)

*Primary Examiner* — Thaddeus J Plecha
(74) *Attorney, Agent, or Firm* — Crowell & Moring LLP; John C. Freeman

(57) ABSTRACT

A technique is disclosed for remotely managing isolated domains on mobile devices. A request is received from the mobile device to instantiate a managed domain. A managed domain configuration is determined and comprises a security policy controlling access to content of the managed domain of the subscribing mobile device, a content specification identifying the content to be downloaded by the subscribing mobile device into the managed domain, and a content configuration identifying a configuration of the content on the subscribing mobile device. The managed domain configuration is sent to the subscribing mobile device to instantiate a secure, managed domain whose policy, content and content configuration is remotely controlled. The technique is useful for advertising and brand promotion on mobile devices as it simultaneously enables detailed control over the presentation of content by a curator while ensuring privacy and security protection of the other apps, accounts and data on the mobile device.

19 Claims, 9 Drawing Sheets

Related U.S. Application Data continuation of application No. 15/037,944, filed as application No. PCT/CA2014/051109 on Nov. 20, 2014, now Pat. No. 10,230,717.

(60) Provisional application No. 61/907,082, filed on Nov. 21, 2013.

(51) Int. Cl.
  *H04W 12/37* (2021.01)
  *H04W 12/086* (2021.01)
  *G06Q 30/0251* (2023.01)

(56) References Cited

U.S. PATENT DOCUMENTS

| | | |
|---|---|---|
| 8,300,810 B2 | 10/2012 | Braun et al. |
| 8,458,800 B1 | 6/2013 | Van et al. |
| 8,544,084 B2 | 9/2013 | Owen et al. |
| 8,561,160 B2 | 10/2013 | Kino |
| 8,590,005 B2 | 11/2013 | Payne, Jr. et al. |
| 8,656,016 B1 | 2/2014 | Bender |
| 8,667,267 B1 | 3/2014 | Garcia et al. |
| 8,724,136 B2 | 5/2014 | Yamamoto |
| 8,839,004 B1 | 9/2014 | Bennett et al. |
| 8,892,878 B2 | 11/2014 | Tucker et al. |
| 9,264,318 B2 | 2/2016 | Quintana et al. |
| 9,304,795 B2 | 4/2016 | Kruglick |
| 9,454,662 B1 | 9/2016 | Buendgen et al. |
| 9,521,126 B2 | 12/2016 | Yarvis et al. |
| 9,524,394 B2 | 12/2016 | Bickford et al. |
| 9,674,153 B2 | 6/2017 | Cucinotta et al. |
| 9,762,555 B2 | 9/2017 | Hua et al. |
| 9,830,456 B2 | 11/2017 | Grieco et al. |
| 9,832,199 B2 | 11/2017 | Boivie et al. |
| 10,230,717 B2 * | 3/2019 | Main .................. H04W 12/37 |
| 10,511,630 B1 * | 12/2019 | Weiss .................. H04L 63/20 |
| 10,951,608 B2 * | 3/2021 | Main .................. H04W 12/086 |
| 11,575,714 B2 * | 2/2023 | Weiss .................. H04W 12/086 |
| 2002/0123336 A1 | 9/2002 | Kamada |
| 2003/0172293 A1 | 9/2003 | Johnson et al. |
| 2004/0268322 A1 | 12/2004 | Chow et al. |
| 2005/0039025 A1 | 2/2005 | Main et al. |
| 2005/0204041 A1 | 9/2005 | Blinn et al. |
| 2005/0240996 A1 | 10/2005 | Hitchcock |
| 2005/0267984 A1 | 12/2005 | Costa-Requena et al. |
| 2006/0009911 A1 | 1/2006 | Burkholder et al. |
| 2007/0055668 A1 | 3/2007 | Main |
| 2008/0037661 A1 | 12/2008 | Xun |
| 2009/0007219 A1 | 1/2009 | Abzarian et al. |
| 2009/0031128 A1 | 1/2009 | French et al. |
| 2009/0063624 A1 | 3/2009 | Nordstrom et al. |
| 2009/0282473 A1 | 11/2009 | Karlson et al. |
| 2009/0318415 A1 | 12/2009 | Brown et al. |
| 2010/0062808 A1 | 3/2010 | Cha et al. |
| 2010/0180338 A1 | 7/2010 | Stewart et al. |
| 2011/0099605 A1 | 4/2011 | Cha et al. |
| 2011/0296521 A1 | 12/2011 | Bernabeu et al. |
| 2012/0047239 A1 | 2/2012 | Donahue |
| 2012/0054853 A1 | 3/2012 | Gupta et al. |
| 2012/0144196 A1 | 6/2012 | Owen et al. |
| 2012/0162257 A1 | 6/2012 | Kim |
| 2012/0297381 A1 | 11/2012 | Ambat et al. |
| 2013/0005360 A1 | 1/2013 | Issa |
| 2013/0054801 A1 | 2/2013 | Belchee |
| 2013/0097657 A1 | 4/2013 | Cardamore et al. |
| 2013/0138932 A1 | 5/2013 | Draluk et al. |
| 2013/0138954 A1 | 5/2013 | Draluk et al. |
| 2013/0151704 A1 | 6/2013 | Chandolu et al. |
| 2013/0156035 A1 | 6/2013 | Lim et al. |
| 2013/0295847 A1 | 11/2013 | Renard et al. |
| 2013/0326606 A1 | 12/2013 | Kelly |
| 2014/0020068 A1 | 1/2014 | Desai et al. |
| 2014/0058937 A1 | 2/2014 | Watson |
| 2014/0115626 A1 | 4/2014 | Sarda et al. |
| 2014/0165134 A1 | 6/2014 | Goldschlag |
| 2014/0214639 A1 | 7/2014 | Roach |
| 2014/0344922 A1 | 11/2014 | Lam |
| 2014/0380425 A1 | 12/2014 | Lockett et al. |
| 2015/0026261 A1 * | 1/2015 | Shimakawa ........ H04L 65/1013 709/204 |
| 2016/0196432 A1 | 7/2016 | Main et al. |
| 2016/0301680 A1 | 10/2016 | Main et al. |
| 2017/0176284 A1 | 6/2017 | Main et al. |
| 2018/0152841 A1 | 5/2018 | Shah et al. |
| 2019/0222559 A1 | 7/2019 | Wang |

FOREIGN PATENT DOCUMENTS

| | | |
|---|---|---|
| CN | 101661381 A | 3/2010 |
| CN | 102405630 A | 4/2012 |
| CN | 102567688 A | 7/2012 |
| WO | WO 2010/027765 A2 | 3/2010 |
| WO | WO 2010/123890 A1 | 10/2010 |
| WO | WO 2011/099605 A2 | 8/2011 |
| WO | WO 2012/170485 A1 | 12/2012 |

OTHER PUBLICATIONS

Canadian Patent Application No. 2931289, Office Action dated Aug. 5, 2022 (4 pages).

Halcrow, "eCryptfs—a Stacked Cryptographic Filesystem," Apr. 2007, 5 pages.

Zhang, X., et al., "A Trusted Mobile Phone Reference Architecture via Secure Kernel", Proceedings of the 2nd ACM Workshop on Scalable Trusted Computing STC07, Alexandria, Virgina, USA, pp. 7-14, Nov. 2, 2007.

Aciicmez, O., et al. "A Trusted Mobile Phone Prototype", Proceedings of the 5th IEEE Consumer Communications and Networking Conference CCNC 2008, Las Vegas, Nevada, USA, Jan. 10-12, 2008, pp. 1208-1209, Jan. 10, 2008.

Schmidt, A, U., et al., "On the Deployment of Mobile Trusted Modules", Proceedings of the IEEE Wireless Communications and Networking Conference WCNC 2008, Las Vegas, Nevada, USA, Mar. 31-Apr. 2, 2008, 6 pages.

Chen et al., "App Isolation: Get the Security of Multiple Browsers with Just One", pp. 227-237 (Year: 2011).

Bugiel, S., et al., "Practical and Lightweight Domain Isolation on Android", Proceedings of the 1st ACM workshop on Security and Privacy in Smartphones and Mobile Devices SPSM'11, Chicago, Illinois, USA, Oct. 17-21, 2011, pp. 51-62.

Russello Go., et al., "MOSES: Supporting Operation Modes on Smartphones", Proceedings of the 17th ACM Symposium on Access Control Models and Technologies SACMAT 12, Newark, New Jersey, USA, Jun. 20-22, 2012, pp. 3-12.

La Polla M., et al. "A Survey on Security for Mobile Devices", IEEE Communications Surveys & Tutorials, vol. 15 (1), first quarter 2013, Feb. 5, 2013, pp. 446-471.

International Search Report and Written Opinion for International Patent Application No. PCT/CA2014/050762, dated Nov. 6, 2014, 9 pages.

International Search Report and Written Opinion for International Patent Application No. PCT/CA2014/050761, dated Nov. 13, 2014, 9 pages.

International Search Report and Written Opinion for International Patent Application No. PCT/CA2014/051109, dated Jan. 22, 2015, 9 pages.

International Preliminary Report on Patentability for International Patent Application No. PCT/CA2014/050762, dated Dec. 16, 2015, 4 pages.

International Patent Application No. PCT/CA2014/050761, International Preliminary Report on Patentability dated Feb. 25, 2016.

International Preliminary Report on Patentability for International Patent Application No. PCT/CA2014/051109, dated Feb. 29, 2016, 18 pages.

European Patent Application No. 14863353, Extended European Search Report dated Apr. 25, 2017.

(56) References Cited

OTHER PUBLICATIONS

European Patent Application No. 14835861.7, Extended European Search Report dated Feb. 23, 2017.
European Patent Application No. 14836724.6, Extended European Search Report dated Feb. 28, 2017.
U.S. Appl. No. 14/911,638, Non-Final Office Action dated Aug. 3, 2017.
European Patent Application No. 14863353.0, Office Action dated Jul. 12, 2018.
Chinese Patent Application No. 201480054937.5, Office Action dated Jul. 24, 2018—English Translation Not Available.
U.S. Appl. No. 14/911,647, Non-Final Office Action dated Sep. 6, 2018.
Canadian Patent Application No. 2931289, Office Action dated Oct. 20, 2021 (4 pgs).
Canadian Patent Application No. 2931289, Office Action dated Dec. 17, 2020 (5 pgs).
European Patent Application No. 14835861.7, Notice of Allowance dated Apr. 7, 2021 (57 pgs).
European Patent Application No. 14863353.0, Communication Pursuant to Article 94(3) EPC dated Apr. 19, 2021 (5 pgs).
U.S. Appl. No. 16/298,631, Notice of Allowance dated Nov. 12, 2020 (10 pgs).
U.S. Appl. No. 16/673,758, Non-Final Office Action dated Oct. 7, 2021 (14 pgs).
U.S. Appl. No. 16/673,758, Requirement for Restriction dated Jul. 2, 2021 (5 pgs).
U.S. Appl. No. 16/298,631, Non-Final Office Action dated Apr. 1, 2020 (42 pgs).

* cited by examiner

MANAGED DOMAINS FOR REMOTE CONTENT AND CONFIGURATION CONTROL ON MOBILE INFORMATION DEVICES

CROSS REFERENCE TO RELATED APPLICATIONS

This application is a continuation of U.S. patent application Ser. No. 16/298,631, filed on Mar. 11, 2019, now pending, which is a continuation of U.S. patent application Ser. No. 15/037,944, filed May 19, 2016, now U.S. Pat. No. 10,230,717, which is a National Phase Entry of PCT/CA2014/051109 filed Nov. 20, 2014, which claims the benefit of priority of U.S. Provisional Patent Application No. 61/907,082 filed Nov. 21, 2013 the entire contents of each of which are hereby incorporated by reference.

FIELD

The present disclosure relates to advertising, brand promotion, and trusted content discovery and distribution on mobile information devices.

BACKGROUND

Online advertising and marketing currently employs a number of different methods in connection with mobile and fixed electronic information devices. For example, web search engines such as Google™, Yahoo™, and Bing™ support ad placement based on search string key word searches as well as contextual advertisements. Web pages and emails may include banner ads, paid links, advertiser sponsorship content, links to social media websites, and the like. Social media websites such as Facebook™ and LinkedIn™ are commonly used for brand and product promotion.

One challenge faced by advertisers in general is the overwhelming volume of advertising messages and media that compete for consumer attention. Consumer attention is a scarce resource and attracting consumer attention and disseminating information to consumers is a fundamental challenge faced by advertisers generally. In online advertising, this has spawned the use of rich media advertising formats such as floating ads, expandable ads, video ads, interactive ads, expandable banner ads, and so forth, to capture the interest of consumers.

A relatively new segment of online advertising is mobile advertising. The increased capabilities (for example, high resolution displays, touch screens, app support, and so forth), high adoption rates, and large installed base of smartphones, tablets, and other mobile devices have resulted in the rapid growth of mobile advertising. For example, spending on mobile advertising increased 83% from US$5.3 billion in 2011 to $8.9 billion in 2012: see IAB Global Mobile Advertising Revenue Report, http://www.iab.net/globalmobile. Mobile advertising has typically taken the form of display ads, text messaging ads, paid search ads, mobile apps, and banners within mobile apps.

In this connection, the model of online advertising and marketing is changing with respect to mobile device usage. The number of mobile apps is growing rapidly (for example, there are currently over 1 million apps available on Google Play™, the largest app store for Android devices) and consumers already spend much more time using mobile apps than they spend browsing the web via mobile browsers. Mobile apps have become or are quickly becoming the principal means for consumers to find, discover, package, and present information, services, and experiences on mobile devices.

In keeping with this trend, companies are increasingly leveraging apps for mobile advertising and marketing. For example, in most developed nations, consumers are more likely to receive mobile advertising via apps than via a mobile browser. Additionally companies may develop and distribute multiple apps for the purpose of mobile advertising and marketing, and mobile advertising is also distributed to consumers via banner ads within apps, such as games, video apps, or social networking apps, such as those developed by Facebook™, LinkedIn™, Instagram™, Tumblr™, Twitter™, and YouTube™. Each social network app has its own user interfaces which have been optimized for the particular information being displayed (e.g., short messages, pictures, videos, etc.).

While advertisers and companies that provide apps to consumers for the purposes of mobile advertising and marketing often promote the apps on web sites, consumers are more likely to use an app, such as Google Play™, to discover and download apps on mobile devices. With millions of mobile apps available on various app stores, it is difficult for consumers to discover apps and to recognize the apps that are authentic (meaning they were developed and distributed by the corporation of interest to the consumer rather than some potentially illegitimate third party). A number of app recommendation and aggregation services have emerged that attempt to filter, rank and recommend apps to consumers, but these are often based either on user supplied ratings, which are sparse or oversimplified recommendations based on user profiles and previously downloaded apps. Similar issues exist in connection with social media apps: that is the problem of finding desirable brands, channels, or feeds, for example. Another approach taken by some original equipment manufacturers to overcome the app discovery problem is to provide pre-loaded apps or "bloatware".

In addition to the above challenges facing advertisers is the increasing consumer concern and desire for privacy of personal information. Until recently, online advertising was typically viewed by consumers via web browsers on personal computers or laptops. Participants in the online advertising industry have been able to collect and store a wealth of personal information about such consumers including, for example, Internet Protocol (IP) addresses, web sites visited, search words entered, and so forth, and use this information for the purposes of targeted advertising. Such information may also be sold to another advertiser.

In response to the increasing concern of consumers over personal privacy, some national governments have implemented privacy legislation, and some web browsers provide mechanisms to control the 'leakage' of personal information (e.g. private browsing modes). Moreover, efforts have been made to improve the transparency of how personal information is collected and used by corporations engaged in online advertising (e.g. website privacy policies).

As such, personal privacy is also a pressing issue in connection with the use of personal electronic devices such as laptops, smartphones, personal digital assistants (PDA's), and the like. Concerns regarding consumer privacy are especially acute with respect to mobile devices because, as compared to a workplace workstation, or even a home PC for example, users tend to store large amounts of personal information on their mobile devices, mobile devices are constantly connected and mobile devices tend to be with consumers for the majority of their waking hours. No other device is more personal and linked to an individual than a personal mobile device. While users of such devices generally desire unimpeded and effortless access to online content, it is becoming increasingly desirable to control and/or limit the collection of personal information in the process. While there presently exists means to prevent or limit the collection of personal information while accessing online content, they typically involve some interference with ready and effortless access to the online content, and are thus undesirable.

Moreover, the increase in mobile advertising on mobile devices raises additional issues resulting from technological differences from online advertising on personal computers. For example, in personal computers personal information is typically better segregated than it is on mobile devices and internet browsers have features that address some privacy issues. Browsers typically operate in a security 'sandbox' which limits the access of the browser to system resources and/or files which may contain personal information on the personal computer. In a browser environment, for a web page to obtain additional permissions generally requires the installation of 'plug-ins' which then can have lower-level access to the operating system services than the sandbox. One of the issues with such plug-ins is that they can be very invasive and change the configuration of your browser and/or the underlying operating system itself (e.g. change the default media player or search engine). As a result, users have become reluctant to download and install plug-ins.

Mobile operating systems have simplified app development (compared to the PC environment), by providing standardized operating system services for apps to access contact information, device owner information, account information (e.g. email account), location, e-mails, messaging, telephony services and payment services (e.g. various payment "wallets"). These services may also be accessed by apps used for mobile advertising and marketing. This further exacerbates user privacy concerns on mobile devices.

In order to address concerns with respect to information privacy and security, some operating systems, such as Android™, provide a permissions framework (or discretionary access control) whereby a consumer must grant the permissions requested by an app prior to installation (e.g. Internet access, access to contacts, global positioning system (GPS) location data, etc.). The permissions are not granular, however—for example, the user must either accept the requested permissions or refrain from installing the app—and many mobile device users do not understand the implications of granting such permissions or combinations of permissions to a mobile app.

The permissions requested by apps may also be leveraged by in-app ad libraries that are incorporated into many free apps as a means for the developer to monetize their app. Certain in-app ad libraries have been found invasively to collect personal information such as a user's call logs, account information, and phone number: see, e.g. M. Grace, W. Zhou, X. Jiang, and A. R. Sadeghi, "Analysis of Mobile In-App Advertisements", *Proceedings of the 5th ACM Conference on Security and Privacy in Wireless and Mobile Networks*, WiSec'12, 2012. Also see: http://www.symantec.com/content/en/us/enterprise/media/security_response/whitepa pers/madware_and_malware_analysis.pdf.

Compounding these concerns associated with personal information privacy are general issues with app security. Developing applications that cannot be exploited by malware or hackers (secure applications) is a challenging task even for experienced application security experts. Mobile app development is a relatively new field and there is a shortage of skilled programmers and mobile application security experts. The increasing use of apps for mobile marketing purposes combined with the large increase in mobile malware (including substantially on the Android™ platform), make it more likely that apps developed by (or for) an advertiser or company may contain vulnerabilities that can be leveraged by another app or malware to obtain private information; this may then affect consumer confidence in the company.

Nevertheless, a significant proportion of consumers tend to be accepting of advertising if it is engaging, low cost and if it originates from a trusted brand, and are further content to provide personal information in order to receive custom advertising which matches their interests.

A yet further issue with current methods concerns the overcrowding of mobile device homescreens. It is generally appreciated that there is value to a company in having content related to the company, such as an app, present on the homescreen of a mobile device given that a user's attention is most often directed to the homescreen. In practice, therefore, app developers and brand managers seek to have their content reside on device homescreens. Given the limited space on device homescreens (typically there is room for about 20 icons), however, overcrowding and message dilution is a problem. Some companies have attempted to overcome this home screen crowding by developing custom launchers that control the mobile device homescreen (e.g. equivalent to the desktop on a personal computer) including the placement of apps on the homescreen. Such efforts (e.g. Facebook™ Home™) have failed due to consumer concerns over privacy (e.g. the launcher can be used to gather information on which apps the consumer uses and how often they use them) and the invasiveness of such efforts.

There is thus an ongoing and pressing need for techniques which enable the effective provision of desired advertising, marketing, and other selected content to personal mobile devices, while minimizing security risks and providing maximal user control over the disclosure of private information that may be stored on the device.

BRIEF DESCRIPTION OF THE DRAWINGS

Embodiments of the present disclosure will now be described, by way of example only, with reference to the attached drawings, as follows.

DETAILED DESCRIPTION

Figure 1:
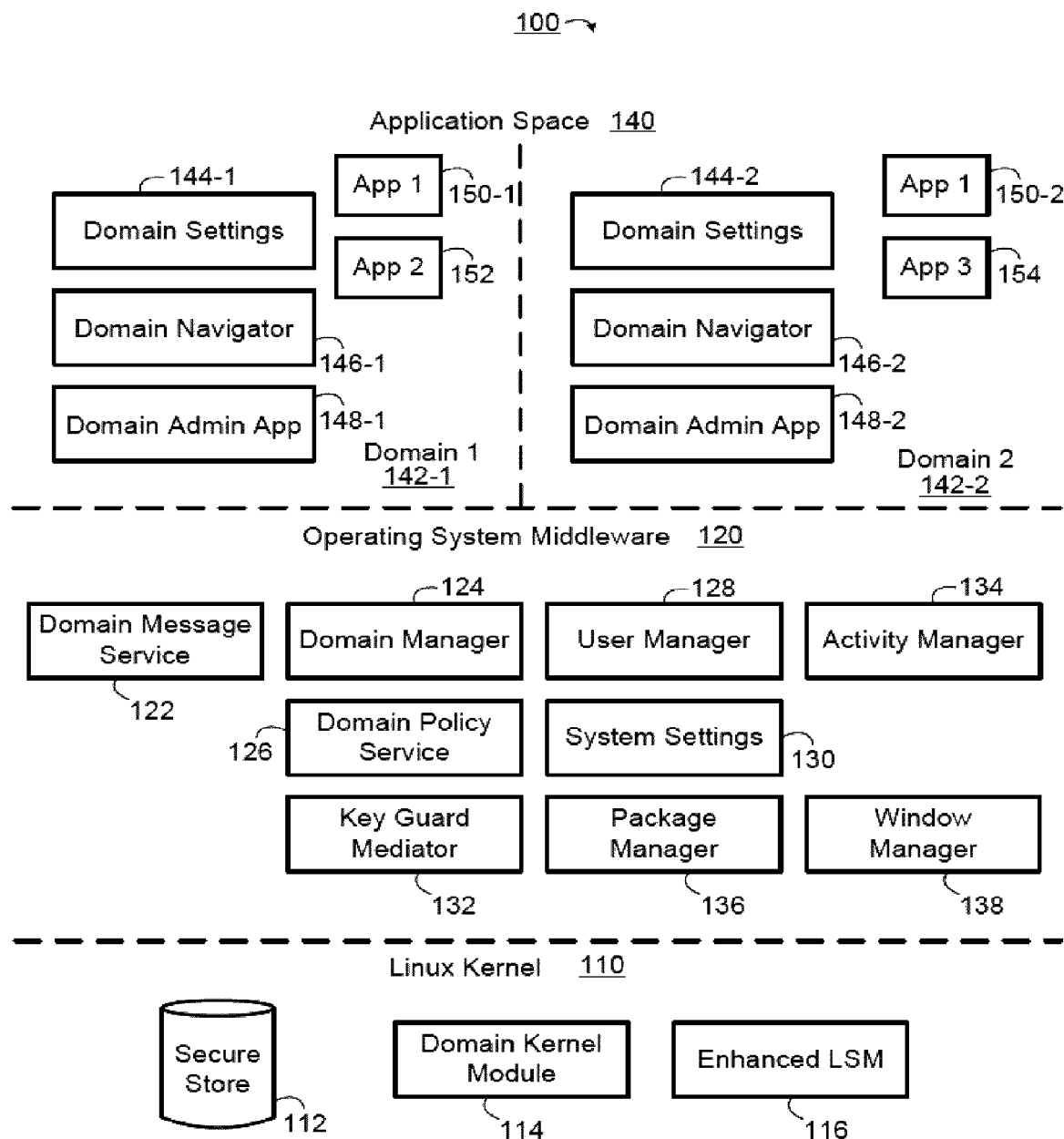
FIG. 1 is a schematic diagram of an operating system configured to provide secure, isolated domains.

The inventive embodiments overcome the defects or disadvantages of conventional means of mobile advertising and marketing described above, provide further abilities or advantages, or provide alternatives to conventional means, by enabling the creation of secure, isolated domains on mobile devices, and by enabling the provisioning and maintenance of the content of such isolated domains by an external third party. A user of the mobile device containing such an externally managed domain can be confident that any content added to the domain does not compromise the security or privacy of personal or other data that may exist outside of the externally managed domain on the device, and is thus comfortable with ceding control over the content within that externally managed domain to a third party. In turn, by having such full or maximal content control over the externally managed domain, the third party is able to tailor the user experience of the content as precisely as desired, that is the content is presented to user in a manner which follows as closely as possible the intention of the third party.

Overview

Techniques for providing multiple isolated domains on mobile devices are described in World Intellectual Property Organization International Patent Application Number PCT/CA2014/050761 and U.S. Patent and Trademark Office application No. 61/864,899 (the "domain isolation applications"), which are incorporated herein by reference in their entireties. These techniques enable the creation of multiple secure, isolated domains on a mobile device wherein user processes run on the device within associated domains, and access by the processes to resources on the device (e.g. data, applications, services) is segregated by domain and controlled by a security policy associated with the domain. Control over the security policy, content, and content configuration of a particular domain can be exercised substantially or entirely by an external third party agent, such as a remote server, without compromising the security or information privacy of the other domains and the personal information that may reside in those other domains on the device.

By using the techniques described above, access to personal information stored on the mobile device in a first isolated domain by apps running in a second isolated domain can be reliably prevented In view of this ability, a user of the device can confidently cede control over the security policy and content of the second domain to an external third party agent such as a remote server. Moreover, given the reliable isolation of the second domain from other domains on the mobile device, the user can confidently grant control over content which is unrestricted or minimally restricted, and thus enables the third party maximum control over the content and presentation of content in the second domain. In addition, the user can readily delete the second domain if it becomes desirable to do so, without leaving any artifacts on the device; this is in contrast to current techniques, such as browser plug-ins, for example, which often reconfigure the personal computer, and thus leave artifacts even after deletion.

In such conditions, the second domain may be termed an 'externally managed domain'. Similarly, the external agent may be termed the 'external domain manager' or, where the functions of the external domain manager are performed by a server or other device, an 'external managing server' or 'external managing device', respectively. Since the content of the externally managed domain is selected by the external domain manager, who thus functions as a curator of the content, the externally managed domain may also be termed a 'curated domain'. Where the content is selected on the basis of a company or organization brand, for example, to present information and/or apps relevant to a brand and the advertisement of goods and services associated with the brand, then the externally managed domain may be termed a 'branded domain', and the function of external domain manager may be performed by a 'brand manager'.

By using secure, isolated domains in this way, an external domain manager is provided maximum ability to tailor, update, and in general control a user's experience with respect to content provided by the external domain manager within the externally managed domain.

For example, a mobile device user may be interested in a particular topic, such as Formula 1™ car racing. Currently, the user can download Formula 1 apps and information feeds, but this requires the user to engage in a discovery process to find the official version of the app within the millions of available apps, navigate to an official Formula 1 Facebook™ page, for example, or find and follow the Formula 1 Twitter™ feed. By using isolated domains, selected content such as apps, videos, information feeds, pictures can be aggregated, distributed and made to reside in an externally managed domain. The user can select a desired content topic based on a brand or other topic of interest (e.g. Formula 1 racing, an NFL™ team, a particular celebrity, etc.) from a web site, bill board, or other media, and all of the pertinent content including apps, information feeds such as social networking or news feeds, and other content associated with the topic would be downloaded or streamed into an externally managed domain on the mobile device. Common social networking apps can be pre-configured by the external domain manager based on the topic (e.g. a Formula 1™ Facebook™ page, Twitter™ feed, YouTube™ channel, or the like), enabling the device owner to use the best and most relevant content. The external domain manager can also aggregate the apps for each Formula 1™ team, manufacturers, photos, wallpapers, theme songs, etc. When the user navigates to the externally managed domain, the notifications and alerts would pertain to the specific theme or topic or event, etc. notifications or real simple syndication (RSS) feeds could be used to promote certain events, such as live streaming, or other offers, such as discounted items or sales.

Thus, 'content', as used herein with respect to managed domains, may be understood as designating a collection of resources such as data files, applications, and services, and may include, for example, pictures, videos, icons, apps, links to information sources, links for recommended apps and the like. In other words, 'content' may be understood generally as including all of the types of user resources ordinarily contained on a mobile information device. As used herein, 'content configuration' may be understood as including any aspects of the configuration of the content which influence or affect a user's interaction with the content, and may include configuration aspects related to presentation of the content (such as an arrangement of icons on the homepage or other screen, a wallpaper, a background, a lock screen, a font, a user interface behavior, the launcher app and so forth) or aspects relating to the function of the content (such as a default webpage of a browser app, a default Facebook™ page, Twitter™ feed, YouTube™ channel, or the like). In general, 'content configuration' may be understood to include any aspects of the configuration of content on a mobile information device which a user, outside of a managed domain, can typically modify.

Thus, use of externally managed domains enables an external domain manager to create, distribute, manage, and update an externally managed domain in order to provide a rich and tailored experience to the device user.

At the same time, users can confidently add such externally managed domains to their mobile devices because they know that the external domain manager and the apps within such an externally managed domain cannot access data in other domains on their mobile device which may contain personal information. Even if an app in the externally managed domain wants permissions to access personal information (e.g. contacts or credentials), the user can be confident that the app cannot access any personal information stored in a different domain. The user does not have to compromise with respect to the value of the content as against the value of their personal information as is often the case for apps downloaded to mobile devices. Even if an external domain manager unknowingly includes malware (e.g. that may target e-mail addresses to sell to spammers or premium SMS services), the apps and file system on the device are completely isolated from the apps in the externally managed domain due to the domain isolation technology used.

Secure, Isolated Domains

A 'domain' may be considered herein to stand for a relationship between a set of similarly trusted resources—data files, applications, and services, for example—and a rule set, or 'security policy', whereby access by processes to the resources is controlled at least in part by the security policy. For example, a particular domain may be considered to include or contain a number of data files which are associated with that domain, and access to those data files is controlled at least in part by a security policy defined in association with that domain. Similarly, an application may be installed or otherwise associated with a particular domain, and access to that application, including the ability to execute the application, for example, is controlled at least in part by a security policy defined in association with that domain.

At any given time, a domain will have associated with it a corresponding security policy and contain content having a corresponding content configuration, all as defined above. Accordingly, each domain may be characterized by a 'domain configuration' including the security policy, the content, and the content configuration corresponding to that domain.

It is sometimes desirable in a single-user device to be able to provide multiple domains having different security policies providing different access to selected applications and other resources. In one case, it may be desirable to provide a restricted domain which requires user authentication for access and contains data or applications which are intended to be inaccessible to children or other third parties, and an open, or 'kids mode', domain which does not require authentication and is intended to be accessible to children (to play games, for example). When operating in the open domain, therefore, it is desirable for the data or applications of the restricted domain to be inaccessible to processes associated with the open domain.

In some embodiments, domain awareness is provided via modification to existing components or services of the operating system or the introduction of new components or services. In some embodiments, at least some of the components and services are provided in the operating system outside of the kernel, that is in the middleware (used herein to mean the operating system outside of the kernel, and between the kernel and user applications). In some embodiments, at least some of the components and services are provided in the operating system kernel. In some embodiments, domain creation and management is enabled by modified or new components or services of the operating system middleware, and domain enforcement is performed by the operating system kernel, and modified or new kernel modules, or kernel modifications, are provided for this purpose.

Accordingly, an exemplary system 100 for providing isolated domains is now described with reference to FIG. 1. The system may be implemented in any computing device including a mobile information device such as a smartphone, tablet, laptop, or a desktop, or any other electronic device having a volatile memory and a processor, the volatile memory containing computer code executable by the processor to provide an operating system and software applications (or 'applications' or 'apps'). The computing device may further include an interface, which may include a user input device such as a keyboard, pointing device, touchscreen, and may further include a communications interface such as a radio and associated control circuitry for communicating over a wired or wireless communications network, which may be the Internet and/or a cellular or WiFi link or Bluetooth, or near field communication (NFC).

The operating system may be characterized as including a kernel, which manages and provides input/output (I/O) services to software applications from the processor and other hardware components of the device, and middleware which provides services additional to those provided by the kernel.

In general, the system 100 includes modifications to operating-system-level protocols to enable domain-awareness. A plurality of domains may be created on the mobile device. In some embodiments the operating system is Android™, although such selection should not be construed as limiting; Android is used only as an example and is similar to other multi-user operating systems (e.g. QNX™, Microsoft Windows™).

Thus, as shown in FIG. 1, the system 100 includes a kernel, which is the Linux™ kernel 110 when the system 100 is implemented in a mobile device running the Android™ operating system. The kernel 100 includes: a secure data store 112, a Domain Kernel Module 114, and a Linux Security Module 116, which in one embodiment is an Enhanced Linux Security Module, whose respective functions will be discussed further below. It will be understood by persons of ordinary skill in the art that the kernel 110 may further have further conventional components (e.g. drivers), or other components different from the foregoing.

The system 100 further includes operating system middleware 120 including: a Domain Message Service 122, a Domain Manager 124, a Domain Policy Service 126, a User Manager 128, a System Settings Module 130, a Key Guard Mediator 132, an Activity Manager 134, a Package Manager 136, and a Window Manager 138. The User Manager 128, System Settings Module 130, Key Guard Mediator 132, Activity Manager 134, Package Manager 136, and the Window Manager 138 correspond to and possess the respective functionalities of known components or services of Android™, but modified to be domain-aware. The Domain Message Service 122, the Domain Manager 124, and the Domain Policy Service 126 are additional components whose functionalities are discussed in the domain isolation applications.

The system 100 further includes an application space 140 (or user space) for implementing one or more domains. For the purposes of illustration, a first domain 142-1 and a second domain 142-2 are shown, but it will be understood that any number of domains may be created on the mobile device. Each domain may include an instantiation of a Domain Settings Module, such as first and second instantiations of Domain Settings Module 144-1, 144-2, and may include first and second instantiations of a Domain Navigator Module 146-1, 146-2 and a Domain Administration Application 148-1, 148-2. Each domain may also have separate instantiations of a first application 150-1, 150-2, while the first domain 142-1 may instantiate a second application 152 different from a third application 154 instantiated in the second domain 142-2.

Figure 2:
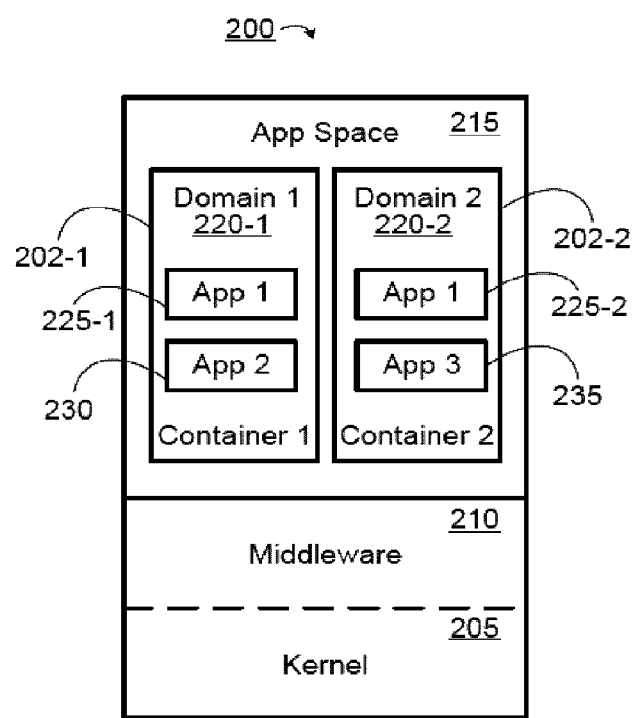
FIG. 2 is a schematic diagram of an alternative operating system configured to provide secure, isolated domains using application containers.

Isolated domains may alternatively be enabled using different techniques. For example, and with reference to FIG. 2, another system 200 may implement isolated domains using application-level containerization. As above, the system 200 operating system has a kernel 205, middleware 210, and application space 215. In this case, one or more application containers 202-1, 202-2 (or domains 220-1, 220-2) share the same hardware and operating system, but use containerization or wrapper technology to act as a proxy between the applications 225-1, 225-2, 230, 235 in the containers 202-1, 202-2 and the OS. This creates multiple independent domains 220-1, 220-2 by providing a layer of indirection so that the lower level device resources, memory and file system can be transparently mapped to higher-level resources that should be accessible only by applications 225-1, 225-2, 230, 235 in the container 202-1, 202-2 or domain 220-1, 220-2.

Upon the creation of a domain, a respective security policy, comprising a policy specification or policy data, is stored in association with it. In some embodiments, at least some domain-specific and cross-domain policy is enforced at the application level and/or middleware level (e.g. authentication time-out). In some embodiments, isolation of processes and entities associated with each domain is enforced at least in part at the kernel level and in accordance with the respective security policies for the plurality of domains. In some embodiments, isolation is enforced at least in part at the middleware level, that is, by operating system services and facilities operating outside of the kernel. The respective policies associated with each domain may be different depending upon the intended role of the domain or its relationship or association with other entities, such as a corporate enterprise service.

Due to their isolation and segregated nature, domains as discussed herein can be considered to be protected domains. For example, one domain may be externally managed by a corporation that does not want its information and proprietary business applications to be compromised in the event the device is lost or stolen, or by malware downloaded by device owner in another domain. At the same time, the device owner does not want the corporation to track their preferences, app usage or personal communications, so he wants his own protected domain as well. Yet, the device owner does not want the same level of authentication to be applied to all applications and services on the device, but be assured that data in protected domains are still secure.

Domain Management System

The secure, isolated domains may be implemented and operated on a mobile information device which in various embodiments is a mobile device such as a smartphone, a tablet, or a personal digital assistant. A external managing server may be configured as disclosed herein to communicate with and to cooperate with the user device to implement externally managed domains on the user device and to populate the externally managed domains with content and generally to manage configuration of the protected domains.

The external managing server may be any device configured to provide the functionality described herein and in one embodiment is a general purpose computer comprising a processor, a communications interface, and a memory encoding instructions operable by the processor to provide the functionality and to perform the methods described herein. The user device and the external managing server may be communicatively connected by any means which enable the communication of information described herein, and in one embodiment are connected over a network which may comprise a wireless or wired network such as the Internet. The user device and server may together compose a system for providing the functionality described herein.

Figure 3:
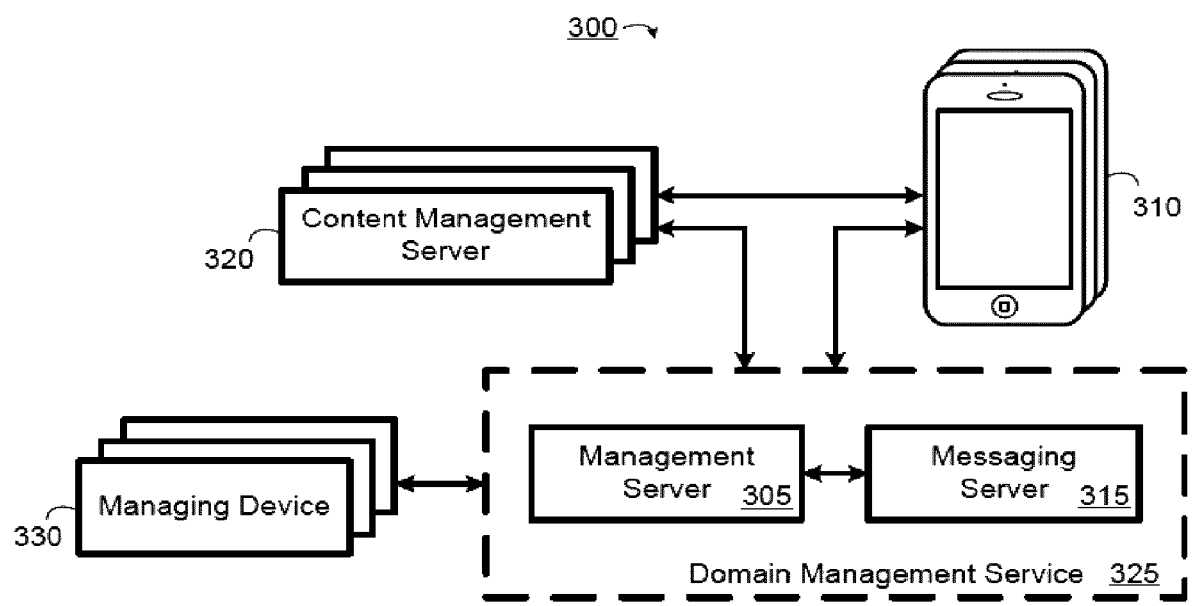
FIG. 3 is a schematic diagram of a system for providing domains managed by a third party on subscribing mobile devices.

Thus, a system 300 for providing externally managed domains is shown in FIG. 3. The system 300 includes a domain management service 325, one or more content management servers 320, and one or more mobile information devices 310, linked via a network (not shown) which may be the Internet. The domain management service 325 may interface with one or more managing devices 330 via the network or otherwise. The domain management service 325 may also include, or interface with, any other components suitable for performing the functions described herein, including for example one or more databases. The links may be wired or wireless, and the network may be the Internet. In general, one or more managing devices 330 accesses the domain management service 325 to create externally managed domains including specifying corresponding domain configurations. The domain management service 325 receives from mobile devices 310 and approves requests to install externally managed domains on the mobile devices 310, and cooperates with the managing devices 330 and content management servers 320 to provision and update the externally managed domains installed on the mobile devices 310.

The mobile information devices 310, although illustrated as smartphones, may also variously include tablet personal computers, laptop computers, or any other mobile information devices possessing the functionality for creation, management, and updating of secure, isolated domains described herein. A mobile information device 310 may be termed, simply, a 'mobile device', and when the mobile device instantiates a managed domain it may also be termed a 'subscribing device' or 'subscribing mobile device'.

The subscribing mobile devices 310 are configured for creating secure, isolated domains as described herein. When such domains are externally managed domains, they are created, managed, and updated in cooperation with the domain management service 325 and the content management servers 320, as described herein.

As shown in FIG. 3, the domain management service 325 may be implemented in a management server 305 and a messaging server 315. For example, the management server 305 may be configured to receive and approve requests from the mobile devices 310 to install externally managed domains managed by the management server 305, to provision such installations with content, and to update such content and otherwise manage the instantiations of the externally managed domain. The messaging server 315 may provide a messaging function for forwarding requests from the mobile devices 310 to the management server 305, and to signal the mobile devices 310 to contact the management server 305 to retrieve instructions, or domain configuration modifications or updates.

In general, the functionality of the domain management service 325 as described below may be implemented using one or more servers, which may include the management server 305 and messaging server 315, or may include additional or different facilities. Moreover, in alternative embodiments, the functionality of the management server 305 may be implemented in more than one management server 305; similarly, the functionality of the messaging server 315 may be implemented in more than one messaging server 315. Alternatively, the domain management function 325 may be implemented in a single, central server.

For example, in instances where multiple externally managed domains are created, the domain configuration of each externally managed domain may be stored in and managed using a different, corresponding management server 305. Alternatively, multiple externally managed domains may be managed using a single management server 305, wherein the external domain manager for each externally managed domain has a separate account on the management server 305. Many variations are possible, so long as the functionality of the domain management service 325 is implemented and provided as described herein.

Managing devices 330 may be used by external domain managers to access the domain management service 325 to enter the security polices and configurations, including content configurations, for creating externally managed domains. For example, the management server 305 may operate one or more web portals accessed via a web browser running on a managing device 330. The domain management service 325 stores the security policies and configurations and communicates with the mobile devices 310 for creating and managing the externally managed domains on the mobile devices 310. For example, management server 305 may receive externally managed domain creation requests from mobile devices 310 and approve them based on the policy specified and stored for the externally managed domain. Mobile devices 310 may communicate with the content management servers 320 for retrieving content in accordance with the content configuration of the externally managed domain. Messaging server 315 may communicate with and direct subscribing mobile devices 310 to communicate with the management server 305 for managing and updating the externally managed domains installed on the mobile devices 310, by communicating content and/or policy modifications, or other management commands, and to forward updates to the subscribing mobile devices 310.

As noted, the mobile devices 310 are linked via the network to the content management servers 320, or simply 'content sources', which may be mobile app stores, content delivery networks and which may include one or more server computers, or one or more mobile information devices such as tablet computers, smartphones, or laptop computers. In general, the content management servers 320 may include any computers or devices for providing content as described herein.

Adding a Managed Domain to a Device

Figure 4:
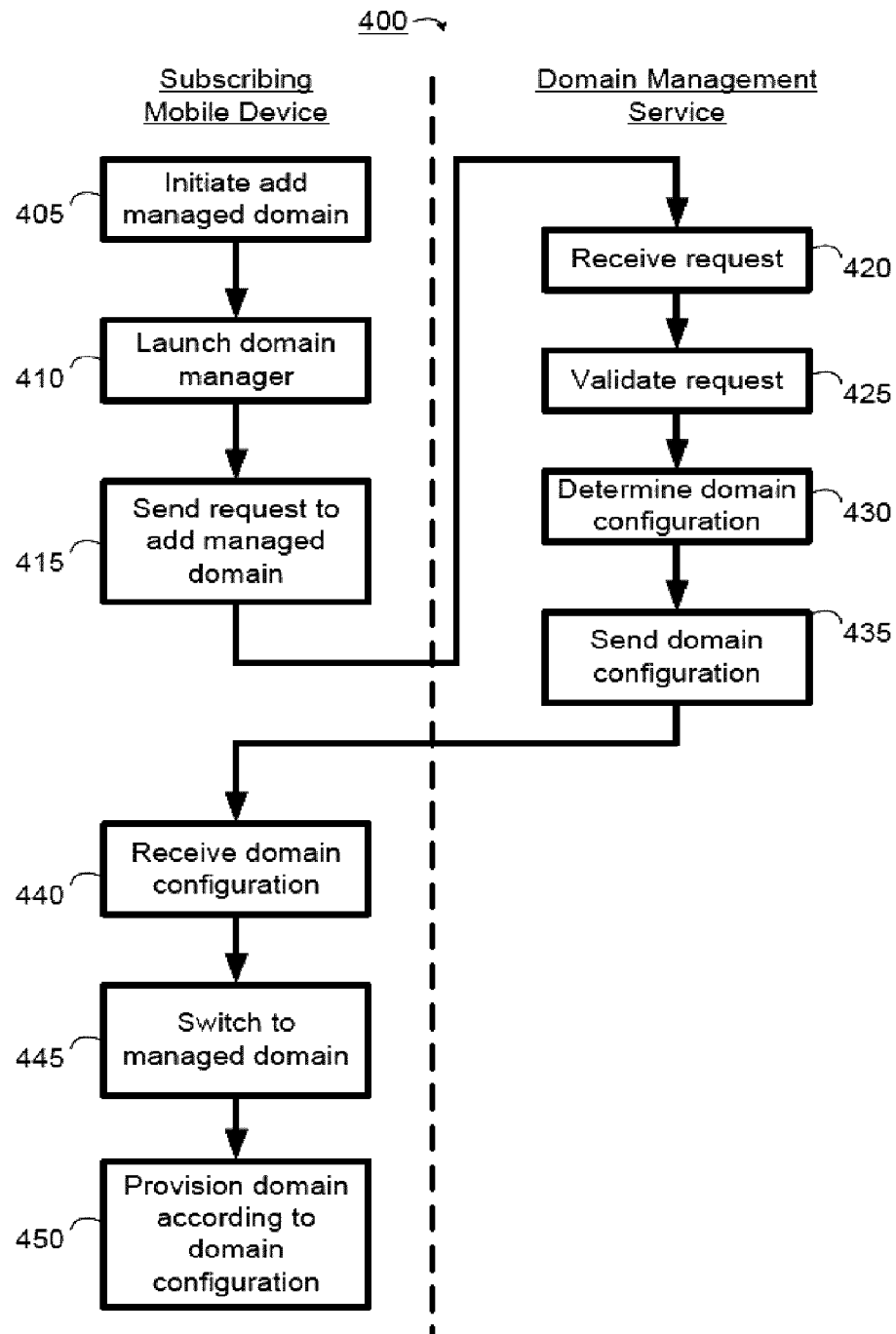
FIG. 4 is a flowchart illustrating a method of adding a domain managed by a third party on a subscribing mobile device.

FIG. 4 shows one embodiment of a method 400 for adding an externally managed domain to a device.

In general, an external domain manager defines or otherwise provides some form of invitation which may be accepted or consumed by a mobile device 310 for initiating the addition of an externally managed domain. The invitation includes or provides means for obtaining an identification of an externally managed domain associated with the invitation. For example, the invitation may take the form of a link or list selection in a website, a quick response (OR) code on an electronic or physical image, a selection of the externally managed domain in an app store, or any other means or method for extending an invitation.

On the mobile device 310, the user performs an action to initiate the installation of the externally managed domain (step 405). The requisite action will depend upon the nature of the invitation. For example, the user may click a link in a web browser on the device, scan a OR code (encoding a URI or MIME type, for example) using a camera of the device, browse an app store and select the externally managed domain via the app store, or a website, and choose the externally managed domain from a list, search result, message, menu or other mechanism.

In response to the above action, the device 310 contacts the domain management service 325 to download to the device 310 a request configuration file. In different embodiments, the device 310 may contact the management server 305 directly. In other embodiments, the device 310 may contact the messaging server 315 which then forwards the request to the management server 305. Where each externally managed domain may be associated with a different management server 305, the messaging server 315 may forward the request to the management server 305 associated with the externally managed domain identified in the request. Where the management server 305 manages multiple accounts, each associated with a different externally managed domain, the management server 305, upon receiving the request, may forward the request to the account associated with the externally managed domain identified in the request.

The URI or MIME type is associated with a particular application or service installed in the device. For example, in the system 100 shown in FIG. 1, the Domain Manager 124 may be registered in connection with URI and launched in order to request the configuration file (step 410), with the command to add an externally managed domain of a type specified in the file. The Domain Manager 124 may then cause the subscribing device 310 to contact the management server 305 with a request to add the externally managed domain (step 415). The request may include such information as: a device identifier (ID) of the device 310, a push messaging service ID (for example, identifying messaging server 315), a domain name, a domain type, a domain ID, a password or token, a geographic location of the user, or other identifiers embedded in a link used to initiate the request. The management server 305 may then receive (step 420) and validate the request (step 425) including verifying the managed domain registration requirements, which may include: validity of a password or token sent with the request, validity of the request itself (e.g. does it come from a permitted software version, or signed by a known certificate), a total number of users allowed or total number of subscribing mobile devices permitted, an expiry date and/or time of the managed domain, a geographic location of the user, and so forth.

The management server 305 may then determine a domain configuration comprising the security policy, content, and content configuration for the externally managed domain (step 430) by assigning the user to a group, and/or by evaluating factors which may include: country or region of origin, device type, current geographic location, and other identifiers embedded in any link activated in order to request the domain addition. The domain configuration is then sent from the managing server 340 (step 435) and received by the device 310 (step 440).

In this context, a 'group' is a collection of users each of which has requested installation of an externally managed domain, or for which an externally managed domain has been defined. Although each group is related to a particular, corresponding externally managed domain, the specific configuration of the domain may be different for the different users in the group depending upon the factors listed above. In general, at least some aspect of the domain configuration, such as an aspect of the security policy, the content, or the content configuration, will at least partly depend on one of the noted factors.

For example, the domain configuration may be determined at least in part based on the current geographic location of the subscribing mobile device. The content specification may identify an app, for example, to be downloaded and installed on the subscribing mobile device. The app may have a predetermined function, e.g. messaging. The app may be selected from a group of apps each having the predetermined function, and each one of the group of apps may be associated with a different geographic region. For example, if the user is known to reside in North America, then the app may be specified as WhatsApp™, whereas if the user is known to reside in Asia the app may be specified as WeChat™.

Other similar variations to the domain configuration based on the factors identified above may be implemented, and for example a domain configuration may have geographic specific elements, user specific elements, and device specific elements.

The operating system of the device 310 may then switch to the newly-created externally managed domain (step 445). Where the device implements system 100, for example, the Domain Navigator 142-1 may carry out the switch when Domain 1 142-1 is active. The operating system, which may include the Domain Manager 124, may then provision the externally managed domain in accordance with the downloaded domain configuration (step 450), which may include; automatically downloading and installing apps; downloading configuration information, including existing app information (e.g. RSS feeds, Twitter™ feed info, YouTube™ channels); downloading and installing home screen configuration (e.g. app positioning) and themes; and/or downloading files such as wallpaper, videos, pictures, etc.

Figure 5:
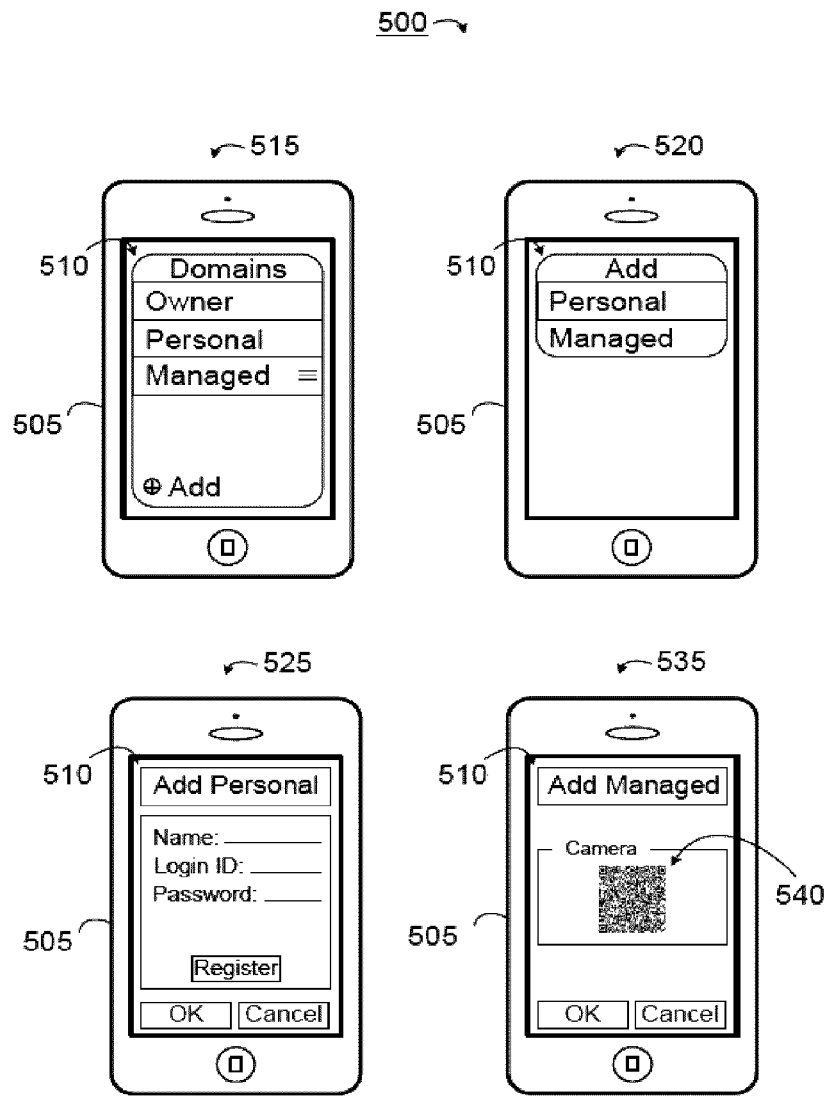
FIG. 5 is a schematic diagram showing user interfaces of a subscribing mobile device for adding a domain managed by a third party on a subscribing mobile device.

FIG. 5 shows one embodiment of a user interface flow 500 for adding externally managed domains on the device. A mobile information device 505, which may be an instance of mobile information device 310, which as shown may be a smartphone but is not limited to such, may display a user interface for adding a externally managed domain. In a domain list screen 515, the user interface 510 presents a list of existing domains in the device 505 as well as a button or other selectable icon for accessing an add domain screen. The add domain screen 520 includes buttons or other selectable icons for accessing an add personal domain or an add managed domain screen. The add personal domain screen 525 provides interface means for adding a personal domain. The add managed domain screen 535 provides interface means for adding a managed domain. Any suitable means may be provided in each of the add personal domain screen 525 and add managed domain screen 535. For example, in the add managed domain screen 535, means may be provided for using a camera (not shown) of the device 505 to capture an image of a OR code 540 for adding an externally managed domain as described herein. The add managed domain screen 535 may alternatively include any interface means for initiating the adding of an externally managed domain as described herein.

With security and personal information privacy issues having been addressed by the implementation of an externally managed domain as a secure, isolated domain, a mobile device user may safely and spontaneously scan a barcode or QR code from a billboard, printed advertisement, web site or a display ad at an event and the externally managed domain may be instantiated on their mobile device. Unlike a work domain described in the domain isolation applications, and which may be considered a particular type or instance of an externally managed domain, no user authentication is typically required for access to non-work externally managed domains. Such non-work externally managed domains may be supported by advertising, promotional budgets and/or product/app positioning within the managed domain. Alternatively, externally managed domains may also support authenticated, freemium, or subscription services. A QR code may contain a one-time password in the uniform resource identifier (URI). The external managing server may limit the number of instantiations in different mobile devices of an externally managed domain with a particular QR code and then change the password or token to prevent additional instantiations of the externally managed domain from being registered; this could be used for promotional purposes (e.g. when the externally managed domain normally requires a subscription), or to control server load. The external managing server may also limit the validity of a particular OR code to a particular window of time (e.g. Monday to Friday or a particular week) or to users in a particular location (e.g. only valid for users in Europe).

On entry to an event, such as sporting event, a mobile device user may receive a unique OR code with a one-time-password (OTP) or token. The externally managed domain may be free for a trial period and then require a subscription to continue. Because the externally managed domain is managed by a third party, access to the externally managed domain may be locked preventing the user from accessing the externally managed domain or the externally managed domain may be wiped (deleted from the device) by the external domain manager if the user does not does not agree to pay a fee for use of the externally managed domain, or if the externally managed domain is intended to be short-term in nature (e.g. an externally managed domain for an event such as the World Cup). Copyright-protected material may be safely downloaded to the externally managed domain as copying of the material may be restricted or prevented by the security policy configured with the externally managed domain. Similarly, if the user no longer wants to access an externally managed domain, the externally managed domain may be readily deleted from the device by the user, and the external managing server may be informed that the domain was deleted by the user.

Since the creation of an externally managed domain on a mobile device is initiated by the user, a bootstrap app may be run when installing the externally managed domain to instruct the user and query their preferences among other tasks. Alternately the bootstrap app may be initiated at different scheduled times, to gather feedback, provide usage tips and/or upsell to new features of the service. Different QR codes or links may be distributed via different channels or geographies (e.g. on-line, billboards, e-mail campaigns, magazines targeted a specific demographic, etc.) and then the effectiveness of the channel may be tracked and assessed.

Creating a Managed Domain

In general, the domain management service 325 is configured to communicate with mobile devices 310 to receive and approve requests to instantiate externally managed domains, to provision such instantiations with content, and to update such content and otherwise manage the instantiations of the externally managed domain.

An external domain manager defines the configuration of the externally managed domain. Since the externally managed domain is separate from the other protected domains on the device, the external domain manager may highly customize the user experience controlling the wallpaper, launcher, themes, and by pushing new apps, app updates, and new content as desired by the external domain manager.

The external domain manager may be provided with tools for configuring externally managed domains, and in general the domain management service 325 receives input for creating and updating an externally managed domain from one or more managing devices 330.

For example, domain management service 325, including in some embodiments management server 305, may operate a web portal accessible by a browser operating on a managing device 330, to access an account maintained on management server 305 in association with a corresponding externally managed domain. In this way, the web portal may be used by the external domain manager via a browser operating on a managing device 330 to enter or otherwise specify the domain configuration for the externally managed domain, to update or otherwise modify the domain configuration, or the cause the deletion of the externally managed domain on one or more mobile devices 310.

Alternative, a managing device 330 may include a mobile device configured with a tool which enables the external domain manager to use the device to configure a prototype of the externally managed domain on that device, e.g. to position the apps on the home screen, preconfigure certain apps, like Twitter™ or an RSS reader to have the right feeds for the specific topic, brand, personality or theme of interest. The tool may then read the configuration data, app list and position and upload this to the management service 305, in order to generate the policy needed to re-create, or 'mirror', the externally managed domain on subscribing mobile devices 310.

Figure 6:
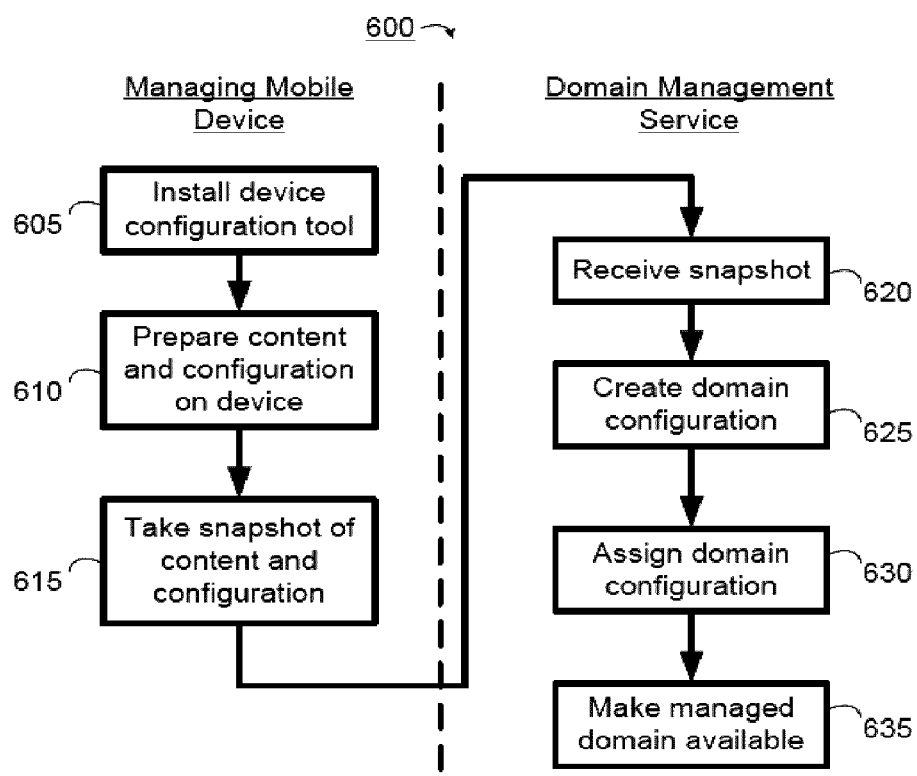
FIG. 6 is a flowchart illustrating a method of creating a managed domain policy including content and configuration.

Accordingly, FIG. 6 illustrates an embodiment of a method 600 for creating or updating a managed domain. In this embodiment, managing device 330 may itself be a mobile device such as tablet computer or smartphone, which in this case may be termed a 'managing mobile device', and the domain management service 325 communicates with the managing mobile device. An instance of the externally managed domain is installed on the managing mobile device, and the content of this installation of the externally managed domain on the managing mobile device is used to provision and update the externally managed domain as installed on any subscribing mobile device 310. In particular, in some embodiments the externally managed domain as installed on the managing mobile device is mirrored on the externally managed domain as installed on one or more subscribing mobile devices 310.

Thus, with reference to Fla 6, the managing mobile device may download and install a device configuration tool (step 605). In some embodiments, the device configuration tool is downloaded from the domain management service 325, for example from a management server 305. For example, the device configuration tool may form an aspect of the content or content configuration of the externally managed domain. A user of the managing mobile device, in this case using the configuration tool on the device, then prepares the content and configuration of the externally managed domain (step 610). In particular, the user may download and install on the managing mobile device in connection with the externally managed domain the apps, videos, pictures, themes, wallpaper, bootstrap app, documents, and so forth, and all such content which is desired to be provisioned to the subscribing mobile devices. The user configures the apps and user interface on the managing mobile device, which may include; configuring and setting apps, themes, wallpapers, and so forth, on the managing mobile device; removing apps; configuring the bootstrap app, which will run at the subscribing mobile device on first entry to the externally managed domain; configuring various apps to the feed, channels, home pages specific to the app; defining home pages for social media or information sites such as Facebook™ feeds for RSS, follows for Twitter™, channels for YouTube™ bookmarks and home page for a browser, and so forth; and/or configuring each app's location and prominence in the user interface.

The device configuration tool is then run which takes a "snapshot", or otherwise creates a database record of all the domain configuration information (step 615). The configuration information may include of specification of the content of the mirrored domain on the managing mobile device and a specification of the configuration of the content. The configuration information is then uploaded to the managing server, which receives the snap shot (step 620). A domain configuration is created (step 625) with input from the curator, if needed, which may include: defining a locate uniform resource identifier (URI) and apps as needed; adding licensing to apps and/or content as needed (for example, paid-for apps may need a license so that they can be download to the managed domain); adding geographic policy information; adding managed domain licensing terms and notices; adding security policy elements; applying device type specific changes and policies (for example, operating system version, screen size and resolution, and so forth). The domain configuration may be assigned to an existing group or groups in a new or existing externally managed domain (step 630). The externally managed domain may then be made available for adding (step 635) as described above.

Updating a Managed Domain

In general, the domain management service may be configured to update the content of an externally managed domain on a subscribing mobile device in any suitable and convenient manner. In some embodiments, the content of an externally managed domain may be modified and updated to subscribing mobile devices periodically. In some embodiments, an externally managed domain may be updated in real-time based on the activities of a user of a managing mobile device, as described above. In an externally managed domain concerning a celebrity, for example, when the celebrity uses a managing mobile device to take a picture, send a text, use an app, or record a video, the same information may be immediately sent to the externally managed domain instantiated on a subscribing device in a real-time manner via a real-time tool installed on the celebrity's device. Such information may be delayed, filtered or curated on the managing server either manually or automatically via policy.

Figure 7:
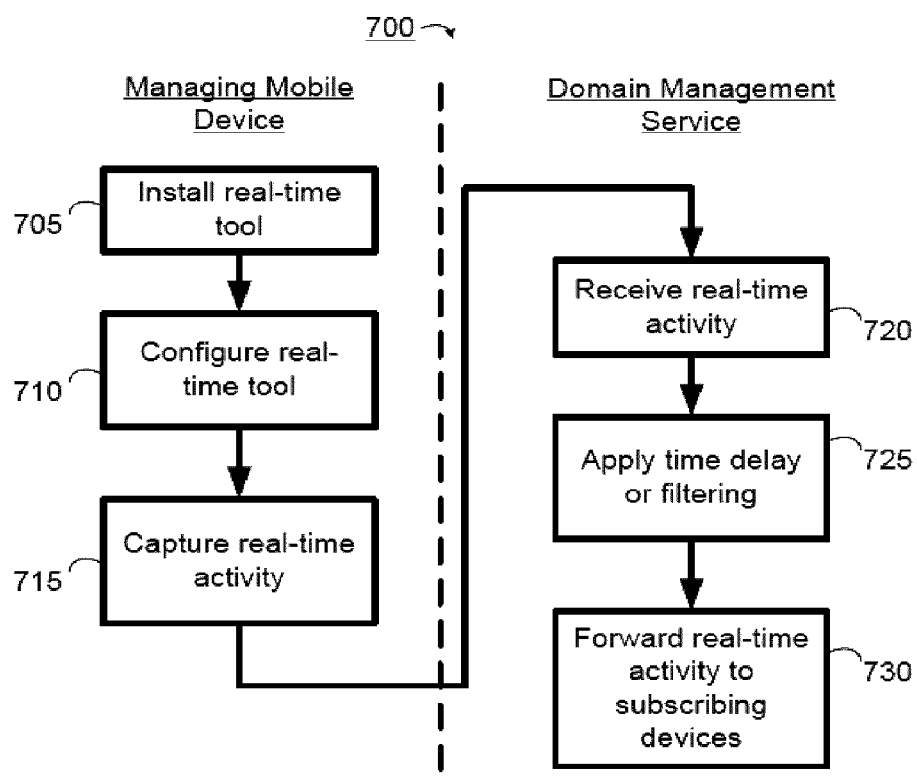
FIG. 7 is a flowchart illustrating a method of updating a managed domain policy with real-time information.

As discussed above, an external domain manager may be provided with tools configured on a mobile device for configuring managed domains. Similarly, this tool (or similar version) may also be used to capture real-time updates such as for a celebrity managed domain, or other situations. The tool may capture new downloaded apps, transfer pictures, screenshots, text messages and usage information (e.g. a certain celebrity is currently playing a particular video game). The tool may upload this to the management service, which may then download or relay real-time updates to all other externally managed domains. These use cases are not restricted to corporations or administrators and third party domain managers. These tools may also easily be used by individuals to create their own externally managed domains for sharing with their friends and family, FIG. 7 illustrates one embodiment of a method 700 for updating an externally managed domain with real-time information.

After an external domain manager creates and uploads an externally managed domain on a managing mobile device, for example by the method 600 shown in FIG. 6, the external domain manager may then download and install a device real-time tool on his managing mobile device (step 705). In some embodiments, the device real-time tool is downloaded from the domain management service 325, for example from a management server 305. The external domain manager may then configure the device real-time tool regarding the type of information to be captured and shared (step 710). For example, information from different apps can be configured for "always share", "prompt for sharing", and "do not share". The external domain manager may thus configure the managing mobile device to share real-time information only when and if prompted, or automatically according to the device real-time tool configuration. In other words, the device real-time tool may capture changes to the content and configuration of the externally managed domain as instantiated on the managing mobile device (step 715), including, for example, key presses, pictures taken, messages sent, and so forth, and in general monitor and capture changes to selected content or configurations.

The device real-time tool may then upload the real-time activity information to the domain management service (step 720), including, for example: domain type, domain ID, device ID, location; usage information including active app, button pushes, messages, high-scores, pictures, videos, information about new apps installed, and so forth. The domain management service may introduce a time-delay on the information—that is, when forwarding the information to subscribing mobile devices—or provide additional filtering based on policy which may be manual or automatic (step 725), such as: scanning for inappropriate content such as pictures, text, audio, including checking of copyright violations; scanning for viruses, malware, phishing links, denial of service attacks.

The domain management service may then forward the information, time-delayed or filtered as the case may be, with subscribing mobile devices (step 730) via and suitable means such as notifications, domain configuration updates (e.g. for new app downloads), documents, picture, and video downloads.

Assigning Permissions and Trust Level

In some embodiments, a user of a mobile information device may selectively permit access by processes in an externally managed domain to resources on the device outside of the externally managed domain. One method of specifying such access is by the assignment of permissions and levels of trust to the externally managing domain.

An externally managed domain from a company that is more security and privacy conscious, such as a bank, may warrant a higher trust than an independent third party managed domain containing video games, for example. For example, a user may be willing to share more personal information with certain external domain managers depending on the external domain manager's reputation, size, privacy policies, or trustworthiness, or the value of the content that the external domain manager provides in a managed domain. For example, a user may be willing to provide certain account information within an externally managed domain to enable app store purchases, re-post pictures (e.g. Tumblr™) or forward messages (e.g. re-tweets on Twitter™), or may wish to enable additional permissions to an externally managed domain (e.g. access to near field communications (NFC) payment information to a banking managed domain, or disable locations services and outgoing phone calls from a "kids domain"). The user may switch to an owner protected domain on the device and assign certain account information to the externally managed domain. The user may also be prompted at install time for the externally managed domain to apply a certain trust level. This introduces the concept of trustworthiness for each different externally managed domain.

Figure 8:
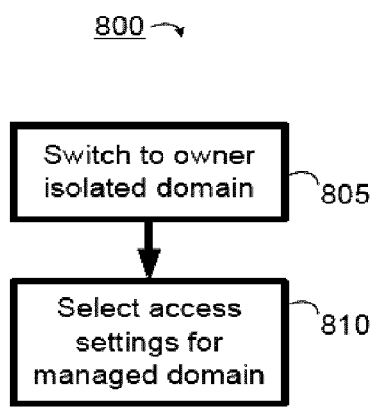
FIG. 8 is a flowchart illustrating a method of selecting access permissions of a managed domain on a subscribing mobile device.

Thus, FIG. 8 shows one embodiment of a method 800 of assigning a level of trust on a mobile information device having an externally managed domain installed. In the method 800, the device is switched to an owner isolated domain (step 805). By means of a user interface, such as an interface for settings for isolated domains, settings of a particular externally managed domain are selected (step 810). The settings may specify, for example, from a selection of accounts which can be used or accessed by the externally managed domain, or contacts, or calendar, or specific files and file directories.

Updating a Managed Domain

Figure 9:
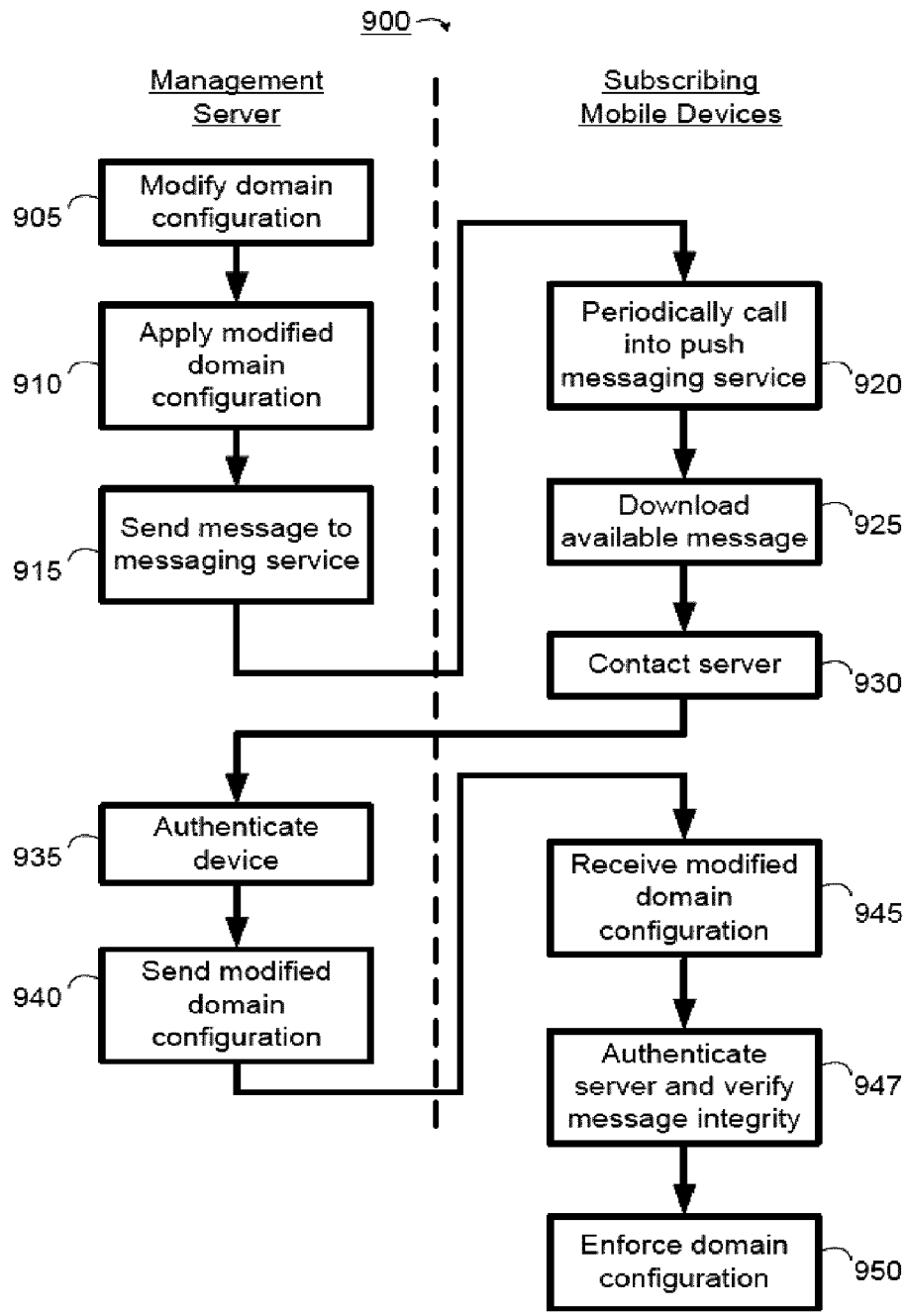
FIG. 9 is a flowchart illustrating a method of updating a managed domain on a subscribing mobile device.

A method 900 of updating an externally managed domain is shown in FIG. 9.

In the method 900, an external domain manager modifies the domain configuration associated on management server 305 with the externally managed domain (step 905) which may include security policy, content, or content configuration information, or creates a duplicate domain configuration and edits the duplicate domain configuration. The domain configuration, or duplicate domain configuration, is applied to one or more subscribing mobile devices instantiating the externally managed domain (step 910). The management server 305 may do this by sending a message to a push messaging service (which may be operated by messaging server 315) for all subscribing devices, or schedules pushes depending on distribution policy, number of devices and server loading (step 915).

The subscribing mobile devices may periodically call into the push messaging service to see if any notification messages exist (step 920). If a message exists, the device downloads the message (step 925), which directs the device to contact the management server 305 (step 930). The management server 305 authenticates the device (step 935) and sends the modified domain configuration to the device (step 940). The device downloads the modified domain configuration (step 945), verifies the message integrity and authenticates the server for the specific externally managed domain (step 947), and enforces the domain configuration (step 950), which may include downloading new apps or configuration information, themes, wallpapers, files, etc.

The apps within an externally managed domain may be updated through a regular app update process, so no additional effort is needed by the app developer to distribute the updated apps to the appropriate externally managed domains. The externally managed domain may support multiple app stores, or downloads of apps directly from the external managing server. Updates to the externally managed domain may be handled by the same policy mechanisms as protected domains. For example, a management server may send a message to a push messaging service (which may be operated by central server 305). When the message is delivered to a subscribing mobile device, the message directs the device to retrieve a command from the management server. The command is a new, or modified, domain configuration. The domain configuration may provide updates to the app list, the configuration data, and other files. The device may download the appropriate files and apps and enforce the policy in the externally managed domain.

Advantages

The above-described techniques may in some embodiments provide numerous advantages including the following.

The techniques described herein use the techniques regarding secure, isolated domains disclosed in the domain isolation applications to enable a mobile information device user to create secure, isolated domains on the mobile device for the purpose of isolating apps and data within the protected domain from apps/malware that may reside on the device in another domain. It enables the user to delegate the management and control of one or more protected domains to a third party, such as a corporate information technology administrator in support of bring-your-own-device (BYOD) practices and policies (i.e. the use of a single device for both personal and work applications). It enables the easy and fast configuration and updating of a domain configuration directly for an externally managed domain and/or with real-time transmitting of information and configuration.

The present techniques provide a platform for rich and interactive advertising and marketing on mobile devices. The platform leverages protected domains, and/or other domain isolation and containerization technologies, such as wrappers, hypervisors, virtual machines or dual persona solutions.

The techniques support functionality including the following: creating externally managed domains on a mobile device by advertisers to enable the aggregation of apps, content, and information feeds that comprise mobile advertising; the aggregation of apps, content and other information via a managing server and the distribution of the aggregation to externally managed domains; the management of a externally managed domain by an advertiser; isolation between apps and data in the externally managed domain from other apps and data that may reside on the mobile device; and mobile device user choice and control over the externally managed domain in terms of access to the externally managed domain and the ability to enable the instantiation of an externally managed domain or delete the externally managed domain and its contents without interfering with other apps or the configuration of the mobile device.

The disclosed technique in some embodiments have advantages including the following: it simplifies the discovery process for related apps and content that a brand manager may make available to consumers; in some cases it works offline, as the mobile device does not have to be connected to the network or have a broadband wireless connection to make effective use of the apps and content in the externally managed domain; it is not invasive to the user as the user can choose to install and access the externally managed domain at his convenience; it addresses privacy concerns that are specific to mobile advertising and mobile apps; it addresses potential liability issues associated with the distribution of apps that may contain vulnerabilities by advertisers; it enables an advertiser to aggregate multiple advertising media into a single managed domain on the mobile device; it may be used with multiple domain isolation technologies, and especially technologies such as hypervisors or virtualization, where the apps do not need modification to be associated with an isolated domain.

In addition, as the external domain manager of each externally managed domain has control over the mobile device homescreen when the externally managed domain is active (e.g. the user has navigated to that domain); it also eliminates the problem of multiple companies, for example, competing for space on a single homescreen, or the problem of one company trying to take over the single homescreen via a custom launcher (e.g. Facebook™ Home™).

In the preceding description, for purposes of explanation, numerous details are set forth in order to provide a thorough understanding of the inventive embodiments. However, it will be apparent to one skilled in the art that these specific details are not required in order to practice the inventive embodiments. In other instances, well-known computer or network structures are shown in block diagram form in order not to obscure inventive embodiments. For example, specific details are not provided as to whether the inventive embodiments described herein are implemented as a software routine, hardware circuit; firmware; or a combination thereof.

Some inventive embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to some inventive embodiments. Those of ordinary skill in the art will appreciate that other instructions and operations necessary to implement the described inventive embodiments can also be stored on the machine-readable medium. Software running from the machine-readable medium can interface with circuitry to perform the described tasks.

The above-described inventive embodiments are intended to be examples only. Alterations, modifications and variations can be effected to the particular embodiments by those of skill in the art without departing from the scope of the inventive embodiments, which is defined solely by the claims appended hereto.

The invention claimed is:

1. A method performed on a mobile device for providing an externally managed domain on the mobile device, the mobile device comprising a processor, a memory, and a communications interface, the memory storing instructions executable by the processor to perform the method, the method comprising:
   using the communications interface to send an add domain request to a messaging server, the add domain request comprising a device identifier of the mobile device;
   using the communications interface to receive from a domain management service a managed domain configuration for the externally managed domain, the managed domain configuration comprising a managed domain security policy operable by the processor to control access to managed domain content in the externally managed domain on the mobile device;
creating the externally managed domain based on the managed domain configuration; and
controlling access to local resources on the mobile device associated with a personal isolated domain on the mobile device different from the externally managed domain by managed domain processes associated with the externally managed domain based at least in part on a personal isolated domain security policy associated with the personal isolated domain;
wherein the controlling access by the managed domain processes to the local resources is performed at least in part by a first service operating within a kernel of an operating system of the mobile device and at least in part by a second service operating in a middleware of the operating system outside of the kernel.

2. The method of claim 1, wherein the managed domain configuration further comprises a managed domain content specification identifying the managed domain content for download by the mobile device into the externally managed domain and a managed domain content configuration specifying a configuration of the managed domain content on the mobile device, and creating the externally managed domain comprises provisioning the externally managed domain based on the managed domain configuration.

3. A method performed on a mobile device for providing an externally managed domain on the mobile device, the mobile device comprising a processor, a memory, and a communications interface, the memory storing instructions executable by the processor to perform the method, the method comprising:
using the communications interface to send an add domain request to a messaging server, the add domain request comprising a device identifier of the mobile device;
using the communications interface to receive from a domain management service a managed domain configuration for the externally managed domain, the managed domain configuration comprising a managed domain security policy operable by the processor to control access to managed domain content in the externally managed domain on the mobile device;
creating the externally managed domain based on the managed domain configuration; and
controlling access to the managed domain content by personal isolated domain processes associated with a personal isolated domain on the mobile device different from the externally managed domain based at least in part on the managed domain security policy;
wherein the controlling access by the personal isolated domain processes to the managed domain content is performed at least in part by a first service operating within a kernel of an operating system of the mobile device and at least in part by a second service operating in a middleware of the operating system outside of the kernel.

4. A method performed on a mobile device for providing an externally managed domain on the mobile device, the mobile device comprising a processor, a memory, and a communications interface, the memory storing instructions executable by the processor to perform the method, the method comprising:
using the communications interface to send an add domain request to a messaging server, the add domain request comprising a device identifier of the mobile device;
using the communications interface to receive from a domain management service a managed domain configuration for the externally managed domain, the managed domain configuration comprising a managed domain security policy operable by the processor to control access to managed domain content in the externally managed domain on the mobile device; and
creating the externally managed domain based on the managed domain configuration;
wherein the add domain request further comprises a current geographic location of the mobile device, and the managed domain configuration is based at least in part on the current geographic location.

5. The method of claim 4, further comprising:
controlling access to the managed domain content by personal isolated domain processes associated with a personal isolated domain on the mobile device different from the externally managed domain based at least in part on the managed domain security policy.

6. The method of claim 5, wherein controlling access to the managed domain content by the personal isolated domain processes comprises preventing access to the managed domain content by the personal isolated domain processes.

7. The method of claim 4, further comprising:
controlling access to local resources on the mobile device associated with a personal isolated domain on the mobile device different from the externally managed domain by managed domain processes associated with the externally managed domain based at least in part on a personal isolated domain security policy associated with the personal isolated domain.

8. The method of claim 7, wherein controlling access to the local resources by the managed domain processes comprises preventing access to the local resources by the managed domain processes.

9. The method of claim 7, wherein controlling access by the managed domain processes to the local resources comprises controlling access by the managed domain processes process to the local resources based in part on the managed domain security policy.

10. The method of claim 7, wherein the mobile device further comprises a user interface, the personal isolated domain security policy comprises local security settings, and the method further comprises operating the user interface to receive the local security settings.

11. The method of claim 10, wherein the local security settings specify permissions or a level of trust associated with the externally managed domain.

12. The method of claim 7, wherein the local resources comprise a particular resource comprising a contacts store, a calendar store, a data file, or a file directory, and the local security settings identify the particular resource.

13. The method of claim 5, further comprising:
controlling access to local resources on the mobile device associated with the personal isolated domain by managed domain processes associated with the externally managed domain based at least in part on a personal isolated domain security policy associated with the personal isolated domain.

14. The method of claim 4, wherein the externally managed domain is a first externally managed domain, the add domain request is a first add domain request, the messaging server is a first messaging server, the domain management service is a first domain management service, the managed domain configuration is a first managed domain configuration, the managed domain security policy is a first managed domain security policy, and the managed domain content is first managed domain content, the method further comprising:
  using the communications interface to send a second add domain request to a second messaging server, the second add domain request comprising the device identifier of the mobile device;
  using the communications interface to receive from a second domain management service different from the first domain management service a second managed domain configuration for a second externally managed domain, the second managed domain configuration comprising a second managed domain security policy operable by the processor to control access to second managed domain content in the second externally managed domain on the mobile device;
  creating the second externally managed domain based on the second managed domain configuration;
  controlling access to local resources on the mobile device associated with a personal isolated domain on the mobile device different from the first externally managed domain and the second externally managed domain by either first managed domain processes associated with the first externally managed domain or second managed domain processes associated with the second externally managed domain based at least in part on a personal isolated domain security policy associated with the personal isolated domain.

15. A method performed on a mobile device for providing an externally managed domain on the mobile device, the mobile device comprising a processor, a memory, and a communications interface, the memory storing instructions executable by the processor to perform the method, the method comprising:
  using the communications interface to send an add domain request to a messaging server, the add domain request comprising a device identifier of the mobile device;
  using the communications interface to receive from a domain management service a managed domain configuration for the externally managed domain, the managed domain configuration comprising a managed domain security policy operable by the processor to control access to managed domain content in the externally managed domain on the mobile device;
  creating the externally managed domain based on the managed domain configuration;
  wherein the managed domain configuration further comprises a managed domain content specification identifying the managed domain content for download by the mobile device into the externally managed domain and a managed domain content configuration specifying a configuration of the managed domain content on the mobile device, and creating the externally managed domain comprises provisioning the externally managed domain based on the managed domain configuration;
  the add domain request further comprises a current geographic location of the mobile device; and
  the managed domain configuration is based at least in part on the current geographic location, wherein the managed domain content specification comprises an identification of content to be downloaded and installed in the externally managed domain based on the current geographic location of the mobile device.

16. The method of claim 15, wherein provisioning the externally managed domain comprises storing the managed domain security policy, using the communications interface to download the managed domain content into the externally managed domain based on the managed domain content specification, and configuring the managed domain content in the externally managed domain based on the managed domain content configuration.

17. A method performed on a mobile device for providing an externally managed domain on the mobile device, the mobile device comprising a processor, a memory, and a communications interface, the memory storing instructions executable by the processor to perform the method, the method comprising:
  using the communications interface to send an add domain request to a messaging server, the add domain request comprising a device identifier of the mobile device;
  using the communications interface to receive from a domain management service a managed domain configuration for the externally managed domain, the managed domain configuration comprising a managed domain security policy operable by the processor to control access to managed domain content in the externally managed domain on the mobile device;
  creating the externally managed domain based on the managed domain configuration;
  wherein the externally managed domain is a first externally managed domain, the add domain request is a first add domain request, the messaging server is a first messaging server, the domain management service is a first domain management service, the managed domain configuration is a first managed domain configuration, the managed domain security policy is a first managed domain security policy, and the managed domain content is first managed domain content, the method further comprising:
  using the communications interface to send a second add domain request to a second messaging server, the second add domain request comprising the device identifier of the mobile device;
  using the communications interface to receive from a second domain management service different from the first domain management service a second managed domain configuration for a second externally managed domain, the second managed domain configuration comprising a second managed domain security policy operable by the processor to control access to second managed domain content in the second externally managed domain on the mobile device;
  creating the second externally managed domain based on the second managed domain configuration;
  controlling access to local resources on the mobile device associated with a personal isolated domain on the mobile device different from the first externally managed domain and the second externally managed domain by either first managed domain processes associated with the first externally managed domain or second managed domain processes associated with the second externally managed domain based at least in part on a personal isolated domain security policy associated with the personal isolated domain;
  the first add domain request further comprises a first current geographic location of the mobile device, and the first managed domain configuration is based at least in part on the first geographic location; and
  the second add domain request further comprises a second current geographic location of the mobile device, and the second managed domain configuration is based at least in part on the second geographic location.

18. A tangible non-transitory computer-readable medium comprising instructions stored thereon that, when executed by a processor of a mobile device, perform the following processes:

using a communications interface to send an add domain request to a messaging server, the add domain request comprising a device identifier of the mobile device;

using the communications interface to receive from a domain management service a managed domain configuration for an externally managed domain, the managed domain configuration comprising a managed domain security policy operable by the processor to control access to managed domain content in the externally managed domain on the mobile device; and creating the externally managed domain based on the managed domain configuration;

wherein the add domain request further comprises a current geographic location of the mobile device, and the managed domain configuration is based at least in part on the current geographic location.

19. A mobile device comprising a processor, a memory, and a communications interface, the memory storing instructions executable by the processor to perform the following processes:

using the communications interface to send an add domain request to a messaging server, the add domain request comprising a device identifier of the mobile device;

using the communications interface to receive from a domain management service a managed domain configuration for an externally managed domain, the managed domain configuration comprising a managed domain security policy operable by the processor to control access to managed domain content in the externally managed domain on the mobile device; and creating the externally managed domain based on the managed domain configuration;

wherein the add domain request further comprises a current geographic location of the mobile device, and the managed domain configuration is based at least in part on the current geographic location.

\* \* \* \* \*